US009148418B2

(12) United States Patent
Shannon et al.

(10) Patent No.: US 9,148,418 B2
(45) Date of Patent: Sep. 29, 2015

(54) SYSTEMS AND METHODS FOR REMOTE ACCESS TO COMPUTER DATA OVER PUBLIC AND PRIVATE NETWORKS VIA A SOFTWARE SWITCH

(71) Applicants: Matthew Martin Shannon, Tampa, FL (US); Matthew James Decker, Valrico, FL (US)

(72) Inventors: Matthew Martin Shannon, Tampa, FL (US); Matthew James Decker, Valrico, FL (US)

( * ) Notice: Subject to any disclaimer, the term of this patent is extended or adjusted under 35 U.S.C. 154(b) by 76 days.

(21) Appl. No.: 14/153,532

(22) Filed: Jan. 13, 2014

(65) Prior Publication Data
US 2014/0337919 A1 Nov. 13, 2014

Related U.S. Application Data

(60) Provisional application No. 61/821,931, filed on May 10, 2013.

(51) Int. Cl.
*H04L 29/06* (2006.01)
*H04L 29/08* (2006.01)

(52) U.S. Cl.
CPC .............. *H04L 63/08* (2013.01); *H04L 67/025* (2013.01)

(58) Field of Classification Search
CPC ............................. H04L 63/08; H04L 67/025
USPC ............................................................ 726/3
See application file for complete search history.

(56) References Cited

U.S. PATENT DOCUMENTS

| 6,345,283 | B1 | 2/2002 | Anderson |
| 6,701,456 | B1 | 3/2004 | Biessener |
| 6,792,545 | B2 | 9/2004 | McCreight |
| 7,016,951 | B1 | 3/2006 | Longworth |
| 7,194,619 | B2 | 3/2007 | Abbondazio |
| 7,197,762 | B2* | 3/2007 | Tarquini ............................ 726/3 |
| 7,415,719 | B2* | 8/2008 | Moghe et al. ..................... 726/1 |
| 7,640,323 | B2 | 12/2009 | Sun |
| 7,899,882 | B2 | 3/2011 | Shannon |
| 7,937,579 | B2* | 5/2011 | Peckover ...................... 713/151 |
| 7,941,376 | B2* | 5/2011 | Peckover ........................ 705/50 |
| 8,171,108 | B2 | 5/2012 | Shannon |
| 2002/0129264 | A1 | 9/2002 | Rowland |
| 2002/0162017 | A1 | 10/2002 | Sorkin |
| 2003/0208689 | A1 | 11/2003 | Garza |
| 2003/0236993 | A1 | 12/2003 | McCreight |
| 2004/0165531 | A1* | 8/2004 | Brady ........................... 370/236 |
| 2004/0177032 | A1 | 9/2004 | Bradley |
| 2004/0260733 | A1 | 12/2004 | Adelstein |
| 2005/0044244 | A1 | 2/2005 | Warwick |
| 2005/0166082 | A1 | 7/2005 | Williams |

(Continued)

*Primary Examiner* — Michael S McNally
(74) *Attorney, Agent, or Firm* — Jeffrey S. Melcher; Manelli Selter PLLC

(57) ABSTRACT

Provided are systems and methods for performing network-based digital data software switching between geographically dispersed subject computing devices, to obtain full access to digital data from the non-transitory computer-readable media of geographically dispersed computing devices such that the entire physical or logical media from each device is fully accessible to one or more user computers on the Internet. This is achieved via network-based digital data software switching systems that may be implemented on public or private networks. The data software switching system may be implemented on a private network for use by a private entity, or it may be achieved via a "cloud computing" model whereupon the user obtains, from a public network such as the Internet, the use of both dedicated and shared resources to engage the data software switching capability.

43 Claims, 10 Drawing Sheets

(56) References Cited

U.S. PATENT DOCUMENTS

| | | |
|---|---|---|
| 2005/0216668 A1 | 9/2005 | Kobayashi |
| 2007/0168455 A1 | 7/2007 | Sun |
| 2007/0204329 A1* | 8/2007 | Peckover .......................... 726/3 |
| 2010/0005509 A1* | 1/2010 | Peckover .......................... 726/3 |
| 2010/0299740 A1 | 11/2010 | Sheldon |
| 2011/0113139 A1 | 5/2011 | Shannon |
| 2011/0153748 A1 | 6/2011 | Lee |
| 2012/0089835 A1* | 4/2012 | Peckover .......................... 713/168 |
| 2012/0191980 A1* | 7/2012 | Kennedy et al. .............. 713/183 |

* cited by examiner

SYSTEMS AND METHODS FOR REMOTE ACCESS TO COMPUTER DATA OVER PUBLIC AND PRIVATE NETWORKS VIA A SOFTWARE SWITCH

This application claims priority to U.S. provisional patent application Ser. No. 61/821,931, filed 10 May 2013, the complete disclosure of which is incorporated herein by reference.

FIELD OF THE INVENTION

The present invention generally relates to systems and methods for a software data switching capability that allows users to obtain and control access to the non-transitory computer-readable media on virtually any computer device from virtually any location, over public and private TCP/IP (Transmission Control Protocol/Internet Protocol) networks. The system and method provide the ability to obtain and control access to the non-transitory computer-readable media of the myriad of existing and forthcoming network capable computing devices, and allows secure, remote access to virtually any computer device, which may remain situated in the device's working environment while being accessed remotely via the software switching technology. The capability can be applied in numerous capacities including, but not limited to, data sharing services, remote computer support operations, data recovery, data loss prevention, data backup, eDiscovery (electronic discovery), digital forensics, remote monitoring, audit compliance, incident response, and mobile device data management. Software switch connections between devices can be established as one to one, many to many, one to many, or many to one connections.

The invention renders digital data from any logical or physical storage media from a networked computing device, for example a computing device connected to the Internet, to be fully accessible to a second computer on the Internet. Furthermore, because the invention can provide the remote data access in a forensically sound manner, the invention allows individuals, whom may not otherwise be qualified in digital forensic techniques, to identify, preserve, collect and analyze Electronically Stored Information (ESI) in a forensically sound manner over public and private networks in the course of delivering forensics or electronic discovery services. This is achieved via network-based software switching that may be deployed in a number of ways.

As one example, this can be achieved via a "cloud computing" model whereupon the user obtains, from the Internet, temporary use of shared resources, software, and information for the purpose of rendering the non-transitory computer-readable media of one or more subject computers as fully accessible to one or more secondary computers over the Internet. The "cloud-based" shared resources, software, and information generally comprise a software data switching system, which is the basis for this invention. As another example, this network-based software switching system can be achieved over private networks, such as a company network, via dedicated resources, software, and information for the purpose of rendering the non-transitory computer-readable media of one or more subject computers is fully accessible to one or more secondary computers over the corporate network and the Internet. In either case, the user must obtain access to the raw (physical or logical) non-transitory computer-readable media of the subject computers in order to perform forensically sound digital forensics operations.

BACKGROUND OF THE INVENTION

While the invention is not limited to the application of computer examination services, the fact that it is suitable for digital forensics services highlights the unique nature of this digital data software switching capability. Computer examination services include, but are not limited to, electronic discovery (eDiscovery), digital forensics, incident response, digital investigations, file recovery, system identification, data preservation, data collection and data analysis. In order that computer examination operations produce information that is suitable for use in a court of law, these services must be provided in a manner consistent with accepted practices from the fields of computer forensics and eDiscovery. Computer forensics and eDiscovery are scientific fields that address the identification, preservation, collection and analysis of data stored on computer systems such that the data is suitable for use in a court of law. Electronic discovery (eDiscovery) refers to the discovery of Electronically Stored Information (ESI) in civil litigation proceedings. Those involved in eDiscovery may include computer forensic practitioners, lawyers, IT personnel, and others, yet sound computer forensics practices are employed to the extent that they are reasonable and practical because the data is subject to being used in a court of law.

Computers, in a myriad form of computing devices (e.g. desktops, laptops, tablets, gaming devices, phones, mobile devices, etc.) are increasingly relied upon for personal and business communications, data creation, data management, and in general, as short and long term data repositories. The information that can be found in these data repositories are often sought after to establish innocence or guilt in a court of law, thus the process of identification, preservation, collection and analysis of data stored on subject computer systems must often be accomplished in accordance with procedures that do not preclude the use of the data as evidence in a court of law. The computer forensics and eDiscovery fields offer acceptable processes and procedures for the identification, preservation, collection, and analysis of computer data, but historical application of these processes and procedures have traditionally required the dedication of considerable amounts of time from experienced forensics and eDiscovery practitioners. Thorough analysis of computer media, such as a hard drive, is a time consuming endeavor, and has traditionally required physical access to the subject computing device during some phase of the identification, preservation, collection and analysis process.

A major challenge to providing forensic services is gaining access to the computing device. The computing device can include sensitive data, which if made public could compromise legitimate business or personal interests. Another challenge is that of identifying computing devices which may have desired evidence. A large corporation may have hundreds, perhaps thousands of computers connected by various networks. Culpable data might be present only on relatively few computers, if any. Obtaining physical custody of all these computers could shut down a large enterprise, or otherwise damage legitimate ongoing business operations. Consequently, it is desirable to gain access to computing devices remotely.

Further, computer forensics analysis may be a very time consuming and expensive process. Typically, the forensic practitioner takes custody of the subject computer, documents it, images it, analyzes it, issues a report, and returns the computer to the user. In many instances, this substantial effort may reveal that the computer has no desired evidence stored on it. Consequently, spending such a large effort, in time and money, to determine whether or not evidentiary data is present on a computing device is often not practical or economically feasible. Accordingly, there is a need for more cost effective and efficient remote access to data located on the myriad of network-based computer devices.

There is a growing demand for systems and methods that provide the ability to obtain and control access to the non-transitory computer-readable media of the myriad of existing and forthcoming network capable computing devices. There is a demand for a capability that provides access to digital data on virtually any computer device from virtually any location using an appropriate methodology and system. There is a need for faster, more efficient, and more cost effective methods of accessing the non-transitory computer-readable media of network capable computing devices which can be applied to virtually any network-based file sharing and data access application.

A prior method of remotely conducting an examination is disclosed in our published U.S. patent application serial No. 2011/0113139, filed 17 Jan. 2011 as U.S. patent application Ser. No. 13/007,874, the complete disclosure of which is incorporated herein by reference.

SUMMARY OF THE INVENTION

The present invention overcomes the physical access challenge and other short-comings of the prior art methods described herein above. The invention provides an effective software data switching capability, allowing secure, remote access to a subject computer, which may remain situated in the computer's working environment.

The invention permits digital data from any logical or physical storage media from a networked computing device, such as a device connected to the Internet, to be fully accessible to a second computer on the Internet. This can be accomplished via a software switch capability allowing connections between devices to be established as one to one, many to many, one to many, or many to one connections. As a "one to many" example, the invention permits forensically sound examinations to be conducted remotely upon many geographically dispersed subject computing devices from one user computer, and eliminates the need for a user to have physical access to the subject computing devices to perform the examination.

Provided are methods and systems for performing network-based digital data software switching between geographically dispersed subject computing devices. The invention renders digital data from the non-transitory computer-readable media of geographically dispersed subject computing devices to be fully accessible via a second set of one or more user computers on the Internet. User access to the digital data from the non-transitory computer-readable media of one or more geographically dispersed subject computing devices is facilitated via digital data software switching systems that can be configured for one way, or bi-directional data transfers among one or many computers.

The invention emulates all non-transitory computer-readable media devices on a machine as raw (physical or logical), read-only SCSI devices, whether the devices are inherently SCSI devices or not. The invention translates SCSI and non-SCSI devices such that the SCSI command set is used to establish raw, and if desired read-only connectivity to subject computer devices from a second computer, over a network. As a result, every non-transitory computer-readable media device on a subject computer becomes a SCSI disk rendered on the second user computer, and that SCSI disk is rendered to the second user computer as a raw (physical or logical) non-volatile device. The connection between the subject and user computers is established and maintained by a software switch through which all data traverses, including command, control, and data transfer traffic.

The present invention differs from existing remote connection and data sharing methods in a number of ways. Consider as an example, the use of NBD (Network Block Device) to connect to a remote computing device to facilitate the remote collection, preservation, and analysis of computer-based evidence. A Network Block Device (NBD) is a standard remote data storage access protocol, introduced in 1998, that allows a client computer to access a data store on a remote system over a TCP/IP communications network. Unlike the present invention, the NBD connection is a peer to peer connection, established directly between the two computers. This may work well on internal Local Area Network (LAN) connections, but does not work well over most Internet connections due to many factors, including but not limited to commonly implemented networking tools and techniques such as firewalls, filters, proxy devices, Network Address Translation (NAT), and Port Address Translation (PAT). Also, in NBD connections data flow control is negotiated and maintained by the two connected computers, whereas the present invention introduces an intermediary software switching device which handles flow control of the data. Furthermore, once the client computer has established an NBD connection, the NBD connection is used as though it were a disk drive actually on the client as opposed to somewhere else on the network. The network block device on the server can be an actual hard disk or even a type of file that can be accessed as though the NBD connection were a disk; however, unlike the present invention, using the standard NBD protocol to establish an NBD connection does not render the NBD as a raw, physical disk on the client computer. If an NBD connected non-transitory media is to be identified by the client computer operating system as a full physical disk, then the media must be "translated" to the client computer to be rendered as a full physical disk. One embodiment of the present invention facilitates this translation. The present invention emulates all non-transitory computer-readable media devices on the subject computer allowing them to be rendered as raw (physical or logical), read-only SCSI devices to the user computer. As such, the user can obtain read-only access to the raw (physical or logical) non-transitory computer-readable media devices of the subject computers in order that forensically sound digital forensics services may be performed.

The present invention reduces delivery times and costs for identification, preservation, collection and analysis of ESI by enabling the process to be conducted upon geographically dispersed subject computers from a central location and by users whom may not otherwise be qualified in digital forensic techniques, thus significantly reducing or eliminating the time required of a qualified forensics practitioner in conducting digital forensics or eDiscovery operations. This improvement significantly increases the efficiency and affordability of digital forensics and eDiscovery data identification, preservation, collection and analysis services. The invention achieves these objectives via systems and methods, using dedicated or shared resources, software, and information to provide access to the non-transitory computer-readable media of remote computing devices on demand over a TCP/IP network.

A Cloud-based architecture embodiment of the invention comprises the following:
1) A Software Switch Management Server is available in the cloud to manage user accounts, and for provisioning switch services to numerous customers.
2) One or more Virtual Machine (VM) capable servers (Software Switch Servers) are located in the cloud, upon which customer dedicated Software Switch VM's (Software Switch computers) can be created on demand.

3) The customer creates a user account on the Software Switch Management Server and uses this account to requisition one or more dedicated Software Switch VM's on any of the available Software Switch Servers. For example, a customer may choose to create a Software Switch VM on a Software Switch Server in the United States of America, and also a Software Switch VM on a Software Switch Server in Great Britain.
4) The Software Switch Management Server provisions the dedicated Software Switch VM(s) on the requested Software Switch Server(s).
5) The customer receives from the Software Switch Management Server the necessary information and credentials to access and control each dedicated Software Switch VM.
6) User program code is installed and started on the user computer(s). The user program code is preconfigured with information and credentials such that the user computer can connect only with the intended dedicated Software Switch VM.
7) User computer(s) establish a command and control connection to the dedicated Software Switch VM via a Websocket connection using the user program code.
8) Subject program code is deployed and started on the subject computer(s) to which connections are desired. The subject program code is preconfigured with information and credentials such that the subject computer can connect only with the intended dedicated Software Switch VM. The subject program code is also configured to control access to the media, as appropriate. For example, the configuration may be crafted to maintain read-only access to the subject computer non-transitory computer-readable media and thus will not permit the user to alter the files or Metadata on the subject computer. The subject program code would thus be constructed to translate commands from a non-transitory computer-readable media device of any type to a read-only SCSI non-volatile media device, and thus could not write to the read-only non-transitory computer-readable media in response to receiving any command including a write command. This establishes the optional read-only capability for the invention, and the capability to present the non-transitory computer-readable media devices on the subject computer as raw (physical or logical) non-volatile computer-readable media devices to the user computer.
9) Subject computer(s) establish a command and control connection to the dedicated Software Switch VM via a Websocket connection using the subject program code.
10) The user instructs the Software Switch VM to establish a switched connection with an available subject computer. A Websocket connection between the user and Software Switch VM is created, a Websocket connection between the subject computer and Software Switch VM is created, and these two connections are patched together by the software switch to create one bi-directional connection between the user computer and subject computer.
11) Non-transitory computer-readable media of the subject computer(s) is available to user computer(s) over the Internet via the Software Switch VM, which switches all communications and data between the user computer(s) and the subject computer(s) via multiple Websocket sessions.
12) The user can make and break switch connections to subject computers for which the user has proper information and credentials, and may also issue a command to stop and remove the subject computer code from the subject computer if desired.

A Local Area Network (LAN) based architecture embodiment of the invention comprises the following:
1) One or more customer dedicated Software Switch Servers are available for use in the corporate LAN. The Software Switch may be, but does not need to be, a Virtual Machine implementation because the Software Switch Server is dedicated to a single customer, and thus runs as a customer dedicated Software Switch computer.
2) The user receives from the Software Switch Server the necessary information and credentials to access and control the dedicated Software Switch.
3) User program code is installed and started on the user computer(s). The user program code is preconfigured with information and credentials such that the user computer can connect only with the intended dedicated Software Switch.
4) User computer(s) establish a command and control connection to the dedicated Software Switch via a Websocket connection using the user program code.
5) Subject program code is deployed and started on the subject computer(s) to which connections are desired. The subject program code is preconfigured with information and credentials such that the subject computer can connect only with the intended dedicated Software Switch. The subject program code is also configured to control access to the media, as appropriate. For example, the configuration may be crafted to maintain read-only access to the subject computer non-transitory computer-readable media and thus will not permit the user to alter the files or Metadata on the subject computer.
6) Subject computer(s) establish a command and control connection to the dedicated Software Switch via a Websocket connection using the subject program code.
7) The user instructs the Software Switch to establish a switched connection with an available subject computer. A Websocket connection between the user and Software Switch is created, a Websocket connection between the subject computer and Software Switch is created, and these two connections are patched together by the software switch to create one bi-directional connection between the user computer and subject computer.
8) Non-transitory computer-readable media of the subject computer(s) is available to user computer(s) over the network via the Software Switch, which switches all communications and data between the user computer(s) and the subject computer(s) via multiple Websocket sessions.
9) The user can make and break switch connections to subject computers for which the user has proper information and credentials, and can also issue a command to stop and remove the subject computer code from the subject computer if desired.

The present invention provides the following advantages:
1) The user need not obtain physical access to one or more subject computers in order to access data from the non-transitory computer-readable media on subject computers.
2) The user need not travel to the site of one or more subject computers in order to access data from the non-transitory computer-readable media on subject computers.
3) The user need not have the one or more subject computers shipped to another location in order to access data from the non-transitory computer-readable media on subject computers.

4) The invention greatly reduces the need to make changes to the network environment in order to achieve a working solution because initial Websocket connections are initiated from the user and subject computers to the Software Switch on TCP/IP ports 80 and 443, which accommodates commonly implemented networking tools and techniques such as firewalls, filters, proxy devices, Network Address Translation (NAT), and Port Address Translation (PAT).
5) Turn-around time to initiate access to data on a subject computer is greatly reduced since integration into existing network architectures is easily accomplished.
6) Full or selected access to active and non-active data on subject hard drives, flash drives, register memory, processor cache, RAM or other non-transitory computer-readable media can be accomplished over the Internet using this invention.
7) Full or selected access to active and non-active data on subject hard drives, flash drives, register memory, processor cache, RAM or other non-transitory computer-readable media can be accomplished over any TCP/IP network from any subject location and to any user location using this invention.
8) The non-transitory computer-readable media is available to be accessed in part or in entirety because the invention renders the media devices as raw (physical or logical) non-transitory computer-readable media devices on the user's computer.
9) Access to subject computer data can be provided in a secure and authenticated manner to authorized Software Switch users.
10) The solution is highly scalable as there is virtually no limit to the number of Software Switch Virtual Machines (VM's) that can be created to serve an unlimited number of users, subjects, and switched connections.

The present invention provides the following advantages when used for computer investigations, examinations, and eDiscovery:
1) The user need not obtain physical access to the one or more subject computers in order to identify, preserve, collect and/or analyze the data on those subject computers in a forensically sound manner.
2) The user need not travel to the site of one or more subject computers in order to identify, preserve, collect and/or analyze the data on those subject computers in a forensically sound manner.
3) The data that the user has uploaded is available for exclusive and perpetual access to the user, or to whomever the user chooses to allow access. The user maintains the ability to authenticate and identify the source of the uploaded data, and thus can handle the data in accordance with accepted evidence handling procedures, such as the Federal Rules of Evidence. As such, the user can maintain a chain of custody over the collected data.
4) Forensic imaging of hard drives, flash drives, register memory, processor cache, RAM or other "non-transitory" computer-readable media may be accomplished over the Internet using this invention.
5) The "non-transitory" computer-readable media is available to be preserved in part or in entirety because the invention renders the media devices as raw (physical or logical) non-transitory computer-readable media devices on the user's computer.
6) The "non-transitory" computer-readable media cannot be altered in any way by the user because the invention renders the devices as read-only non-transitory computer-readable media devices on the user's computer, if so configured.
7) Turn-around time to complete an inspection upon a subject computer is greatly reduced since the inspection can be conducted from anywhere on the Internet, and upon a subject computer that is accessible anywhere via the Internet.
8) Physical control of the subject computer need not occur in order for an inspection to be conducted.
9) Using the invention, the time required of an expensive expert resource is minimized for conducting an inspection.
10) Using the invention, the process of identifying, preserving, and collecting the data on one or more subject computers can be accomplished in a forensically sound manner by trusted resources with much more limited skill sets than those of an expert in digital forensics or eDiscovery.

DETAILED DESCRIPTION OF THE INVENTION

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

The invention will now be explained with reference to the attached non-limiting Fig. The operations described in Figs. and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 1:
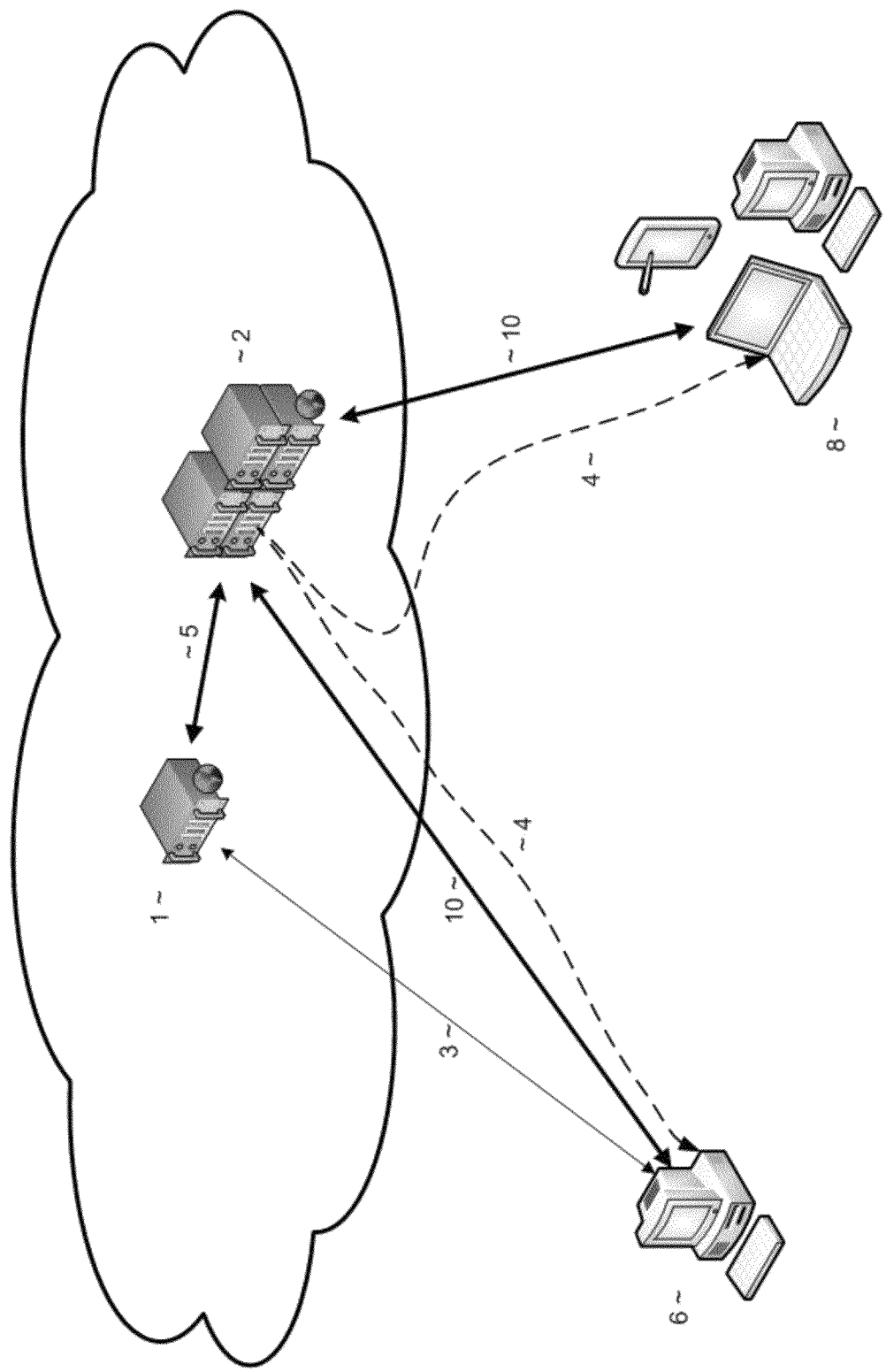
FIG. 1 illustrates the software switch media access system deployed as a cloud-based service according to the present invention.

As shown in FIG. 1, the cloud-based computer system comprises at least one computer system, a "Software Switch Server" 2. The term "cloud-based" is used in the broadest sense to mean any computer connected to the Internet. For the system to allow multiple customers to be served by the Software Switch Server 2, the cloud-based computer system comprises at least one additional computer system, a "Software Switch Management Server" 1. The Software Switch Server 2 and the Software Switch Management Server 1 are on separate computers, as shown in FIG. 1. While the invention is explained with reference to a separate Software Switch Server 2 and Software Switch Management Server 1, the Software Switch Management Server 1 is used only in the cloud-based architecture to manage user accounts and for provisioning and de-provisioning software switch VM'S (Software Switch Computers 2) when multiple Software Switch Computers 2 are to be created and used to service multiple customers.

A preferred cloud-based architecture is shown in FIG. 1. A Software Switch Management Server 1 is available to manage user accounts, and for provisioning and de-provisioning Software Switch Virtual Machines (VM's) that are created on a Software Switch Server 2. Software Switch Servers 2 are located in the cloud, upon which customer dedicated Software Switch VM's can be created on demand. A customer (in this case a user computer 6) can communicate with the Software Switch Management Server 1 to purchase Software Switch services via a user account using the command and control connection 3. The Software Switch Management Server 1 provisions a dedicated Software Switch VM on the requested Software Switch Server 2 over a command and control connection 5. The user computer 6 then receives the necessary information and credentials to access and control the dedicated Software Switch VM over a command and control connection 3. The user program code is then installed and started on the user computer(s) 6, whereupon the user computer(s) 6 establish a command and control connection 10 to the dedicated Software Switch VM 2. The subject program code is deployed and started on the subject computer(s) 8, whereupon each subject computer 8 establishes a command and control connection 10 to the dedicated software switch VM 2. The subject program code is preconfigured with information and credentials such that subject computer(s) 8 can connect only with the intended dedicated software switch VM 2. The user instructs the software switch 2 to establish a connection with an available subject computer 8 which creates a bi-directional data connection 4 between the user computer 6 and subject computer 8 via the software switch 2. This bi-directional data connection 4 is a software switch connection between the two devices over which the non-transitory computer-readable media of the subject computer is made fully accessible to the user computer over the corporate network and the Internet. The user computer 6 starts, stops, and controls software switch connections with subject device(s) 8 via the dedicated VM Software Switch 2. There is no limit to the number of Software Switch VM's 2 that can be created in this model. FIG. 1 presents one VM Software Switch 2 serving one user computer 6, but as a practical example, thousands of Software Switch VM's could be created to serve thousands of users 6.

The registered customer can purchase temporary rights to use the system, which is typically delivered as a service via a cloud computing model, but can be deployed for exclusive use on a private network if cloud-based systems are not desired. Internet access is a prerequisite to use the system. As an example, the registered customer might be a lawyer representing a client in a civil lawsuit. That lawyer may need to inspect his client's subject computer(s) 8 for documents responsive to a discovery request in the litigation. That lawyer could use the systems to inspect his client's subject computer(s) 8 over the Internet from any user computer 6 via the Software Switch Server 2. The customer (user computer 6) can only connect to the subject computer(s) 8 via the Software Switch Server 2, and cannot directly connect to the subject computer(s) 8. Subject computer(s) 8 are selected for inspection, and subject program code is deployed to one or more subject computers 8. When executed, the subject program code provides communications via a communication code to the Software Switch Server 2. The subject computer 8 is then connected to the Software Switch Server 2 so that the customer on the user computer 6 can access information on the subject computer 8 via the Software Switch Server 2.

The service can comprise any number of explicit actions or instructions, but can be used to collect data from the subject computer(s) 8, and will store the collected data in a forensically sound manner to a storage location available to user computer 6. As an example, the customer (user) can enter a request into the user computer 6 to obtain a listing of all files, including deleted files for which entries remain in the file system tables on the subject computer 8. The Software Switch Server 2 will pass the instruction to the subject computer 8 to copy the requested data to the data-repository user computer 6. The data includes the files along with their original file system Metadata. The communication protocols used can prevent the Software Switch Server 2 from altering the data on the subject computer(s) 8. Thus, the original file system Metadata would not be altered on the subject computer(s) 8, and would be forensically preserved at the time of collection and stored in the non-volatile memory on the user computer 6. When the service actions are complete, the collected data is accessible to the customer's user computer 6.

Upon review of the stored data, the customer may require additional inspections be performed in order to obtain additional data from one or more subject computer(s) 8. The customer would continue to use the system in the same manner as described above until the inspection effort is completed.

At the completion of the forensic analysis, a report can be outputted.

Figure 2:
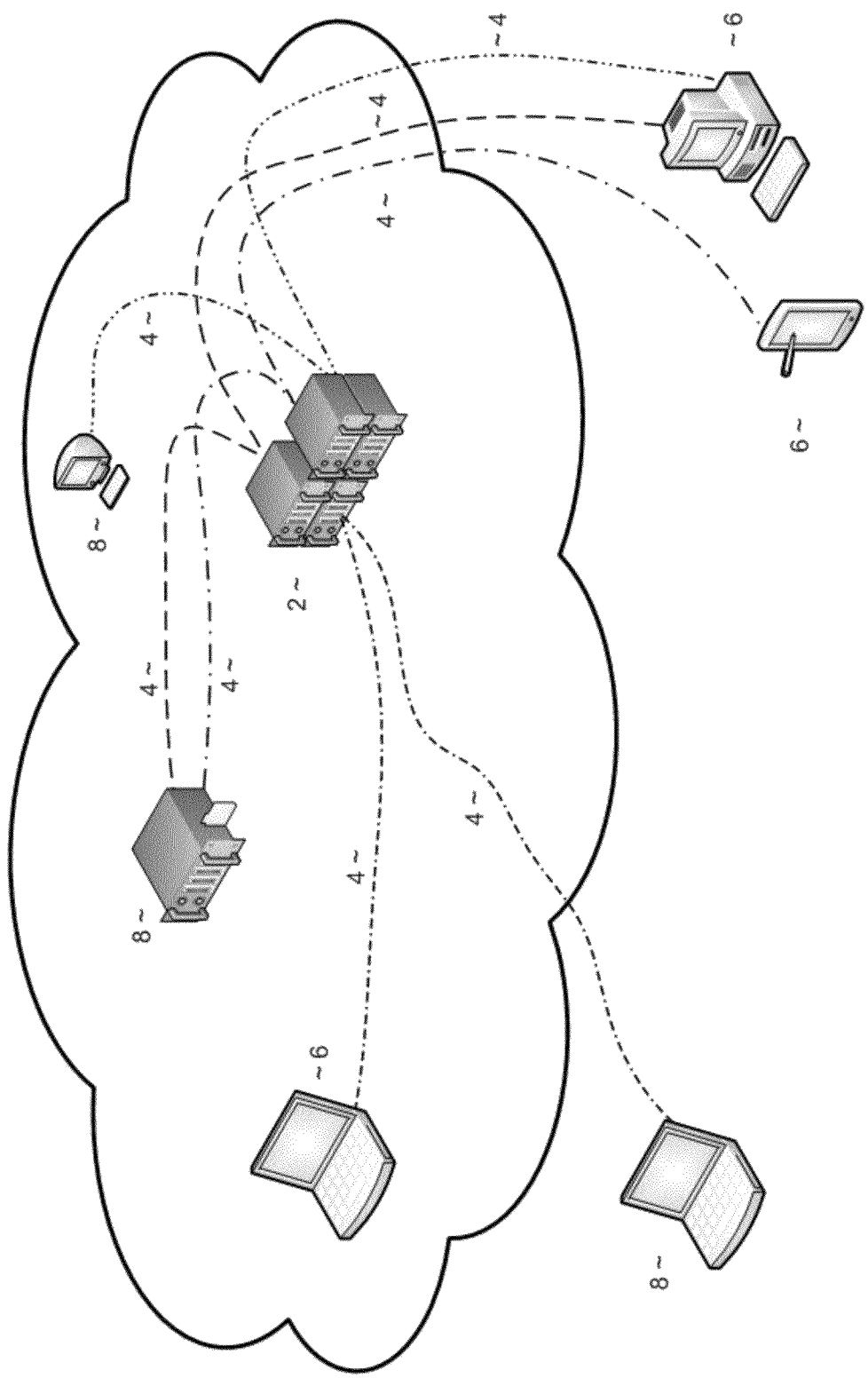
FIG. 2 illustrates the software switch media access system deployed as a customer dedicated appliance solution in a LAN-based (Local Area Network-based) scenario according to the present invention.

FIG. 2 illustrates the software switch media access system deployed as a customer dedicated appliance solution in a LAN-based (Local Area Network-based) scenario according to the present invention. The Software Switch Server 2 is implemented as a dedicated appliance solution in a company network. In this example, several software switch connections have been established by several users 6 for a number of purposes.

FIG. 2 shows an example with several switched connections on a Software Switch Server Appliance employed in a corporate environment. The Software Switch Server 2 may or may not use a VM implementation. Command and control connections 10 are also used, but not shown in this example.

As shown in FIG. 2, a Software Switch connection has been established between Corporate User 6 and Subject Remote Company Computer 8 via the Software Switch 2. Such a connection would be established, for example, to facilitate a corporate examiner conducting an investigation on a company subject computer located at a remote location.

As shown in FIG. 2, Software Switch connections have been established between Remote User 6, Subject Company Computer 8, and Company File Server 8 via the Software Switch 2. The Software Switch 2 connections from Remote User 6 to Company File Server 8 would permit the remote user 6 to access company file server data 8 from anywhere on the Internet. The Software Switch 2 connections from Remote User 6 to Subject Company Computer 8 would permit the remote user to access Subject Company Computer 8 data from anywhere on the Internet. This scenario enables secure sharing of company data regardless of the data location, with local LAN users or remote users over the Internet.

As shown in FIG. 2, Software Switch connections have been established between remote tablet User 6, and Company File Server 8 via the Software Switch 2. The Software Switch 2 connections from remote tablet user 6 to Company File Server 8 permits the remote tablet user 6 to access company file server data 8 from anywhere on the Internet via the Software Switch 2 connection.

Figure 3:
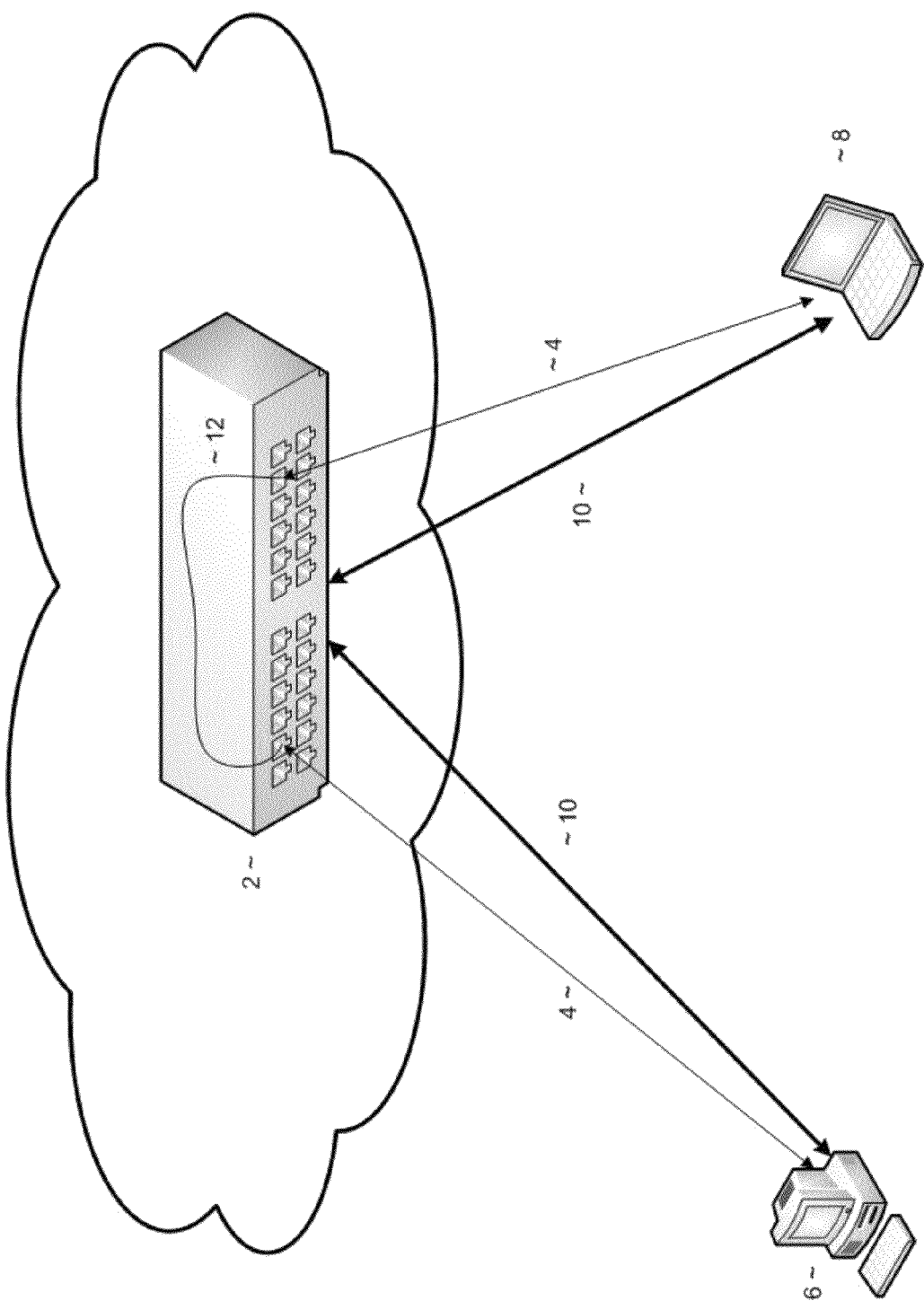
FIG. 3 illustrates the software switch in use in a One to One connection configuration.

FIG. 3 illustrates the Software Switch 2 serving in a one user to one subject connection scenario. The customer dedicated Software Switch 2 is represented in this diagram as a physical device to assist in conceptualizing the switch's capability, yet the software switch is realized as a software solution in practice, and the number of possible connections is practically unlimited. Websocket data connections 4 to the Software Switch 2 are initiated by the User Computer 6 and the Subject Computer 8. These connections are available to establish switched connections 12, through which data transfers between User Computers 6 and Subject Computers 8 via the Software Switch 2 are facilitated. User initiated Websocket command and control connections 10 with the Software Switch 2 permit each user 6 to start, stop, and otherwise control their connections to subject devices via the dedicated Software Switch 2. Subject initiated Websocket command and control connections 10 to the Software Switch 2 permit subjects to receive and respond to commands from the user. In this diagram, one (1) switched connection 12 has been configured to connect one (1) User Computer 6 to one (1) Subject Computer 8.

Figure 4:
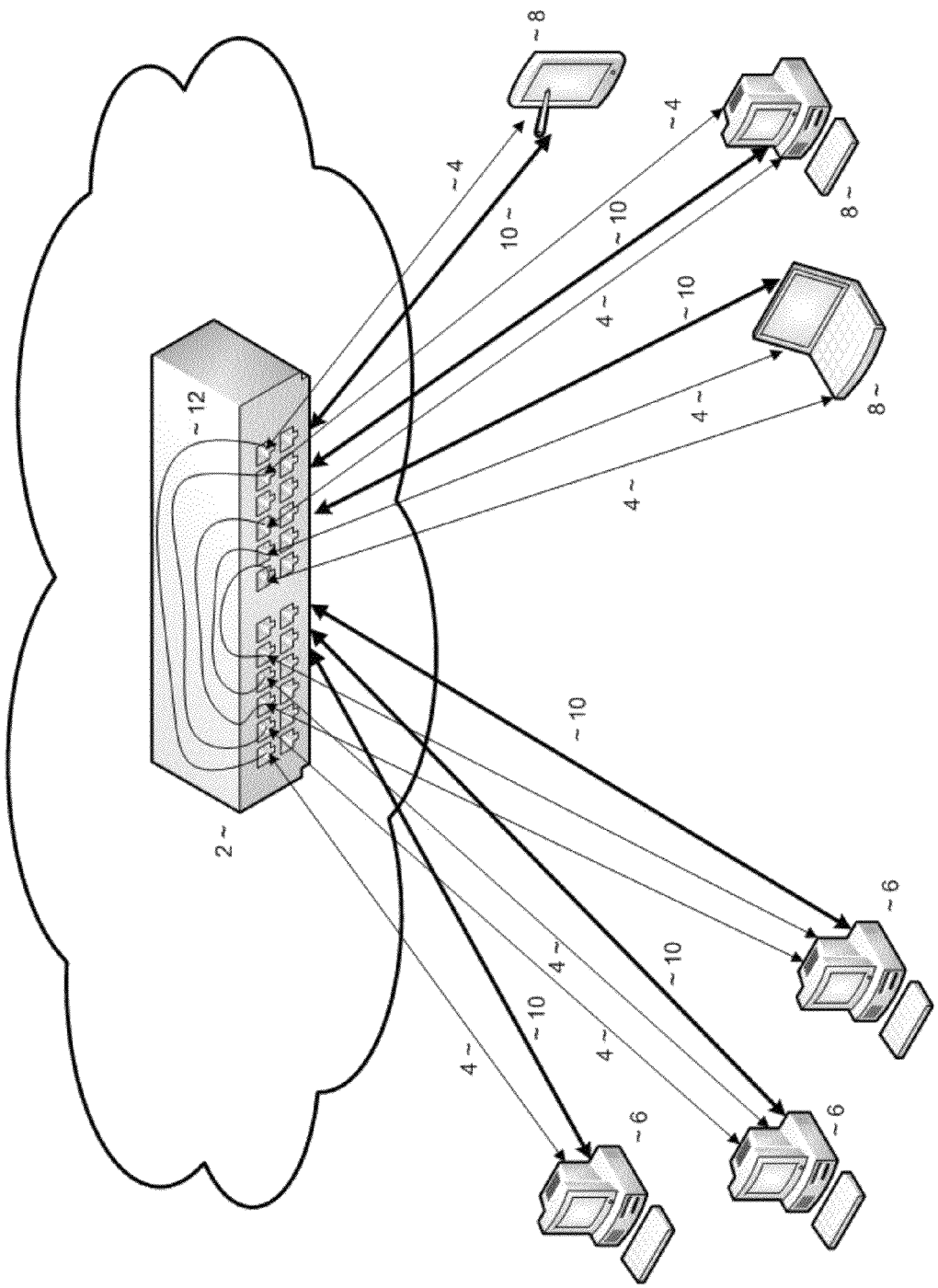
FIG. 4 illustrates the software switch in use in a Many to Many connection configuration.

FIG. 4 illustrates the software switch in use in a Many to Many connection configuration. The customer dedicated Software Switch 2 is represented in this diagram as a physical device to assist in conceptualizing the switch's capability, yet the software switch is realized as a software solution in practice, and the number of possible connections is practically unlimited. Websocket data connections 4 to the Software Switch 2 are initiated by the User Computer 6 and the Subject Computer 8. These connections are available to establish switched connections 12, through which data transfers between User Computers 6 and Subject Computers 8 via the Software Switch 2 are facilitated. User initiated Websocket command and control connections 10 with the Software Switch 2 permit each user 6 to start, stop, and otherwise control their connections to subject devices 8 via the dedicated Software Switch 2. Subject initiated Websocket command and control connections 10 to the Software Switch 2 permit subjects 8 to receive and respond to commands from the user 8. In this diagram, five (5) switched connections 12 have been configured to connect three (3) User Computers 6 to three (3) Subject Computers 8. As shown, a single User Computer 6 can be connected to multiple Subject Computers 8, and a single Subject Computer 8 can be connected to multiple User Computers 6.

Figure 5:
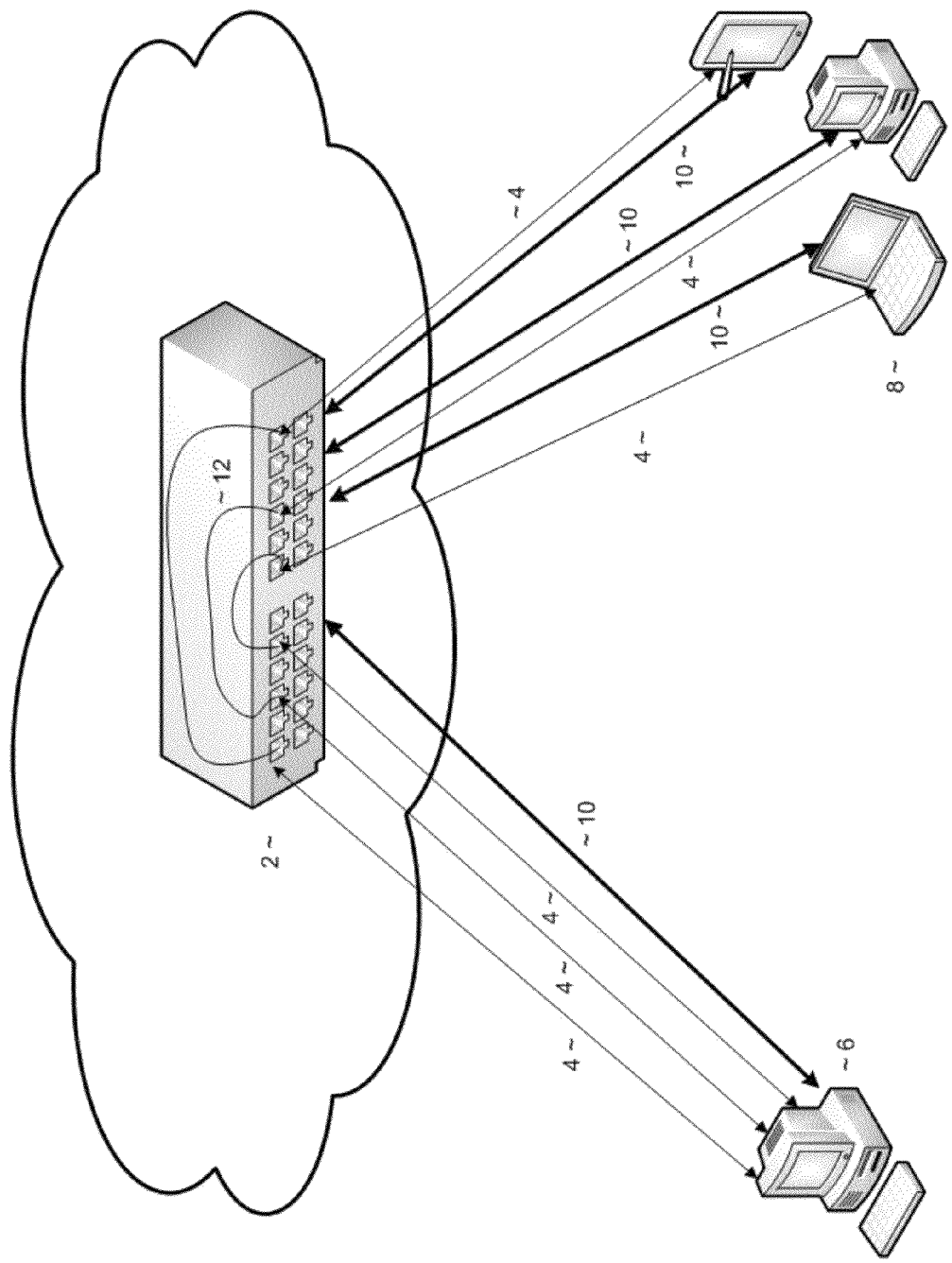
FIG. 5 illustrates the software switch in use in a One to Many connection configuration.

FIG. 5 illustrates the software switch in use in a One to Many connection configuration. The customer dedicated Software Switch 2 is represented in this diagram as a physical device to assist in conceptualizing switch's capability, yet the software switch is realized as a software solution in practice, and the number of possible connections is practically unlimited. Websocket data connections 4 to the Software Switch 2 are initiated by the User Computer 6 and the Subject Computer 8. These connections are available to establish switched connections 12, through which data transfers between User Computers 6 and Subject Computers 8 via the Software Switch 2 are facilitated. User initiated Websocket command and control connections 10 with the Software Switch 2 permit each user to start, stop, and otherwise control their connections to subject devices via the dedicated Software Switch 2. Subject initiated Websocket command and control connections 10 to the Software Switch 2 permit subjects to receive and respond to commands from the user. In this diagram, three (3) switched connections 12 have been configured to connect one (1) User Computers 6 to three (3) Subject Computers 8.

Figure 6:
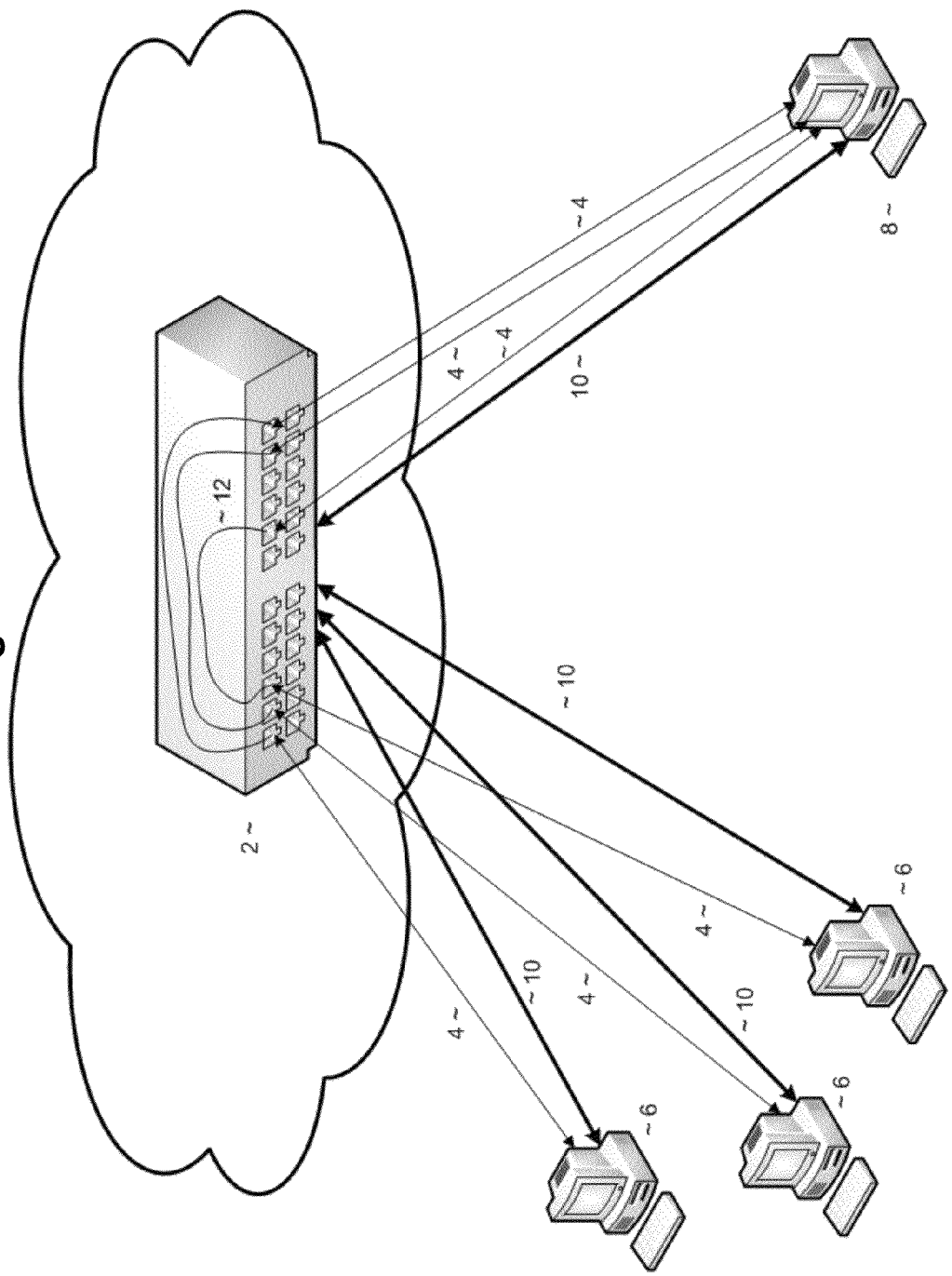
FIG. 6 illustrates the software switch in use in a Many to One connection configuration.

FIG. 6 illustrates the software switch in use in a Many to One connection configuration. The customer dedicated Software Switch 2 is represented in this diagram as a physical device to assist in conceptualizing switch's capability, yet the software switch is realized as a software solution in practice, and the number of possible connections is practically unlimited. Websocket data connections 4 to the Software Switch 2 are initiated by the User Computer 6 and the Subject Computer 8. These connections are available to establish switched connections 12, through which data transfers between User Computers 6 and Subject Computers 8 via the Software Switch 2 are facilitated. User initiated Websocket command and control connections 10 with the Software Switch 2 permit each user to start, stop, and otherwise control their connections to subject devices via the dedicated Software Switch 2. Subject initiated Websocket command and control connections 10 to the Software Switch 2 permit subjects to receive and respond to commands from the user. In this diagram, three (3) switched connections 12 have been configured to connect three (3) User Computers 6 to one (1) Subject Computer 8.

Figure 7:
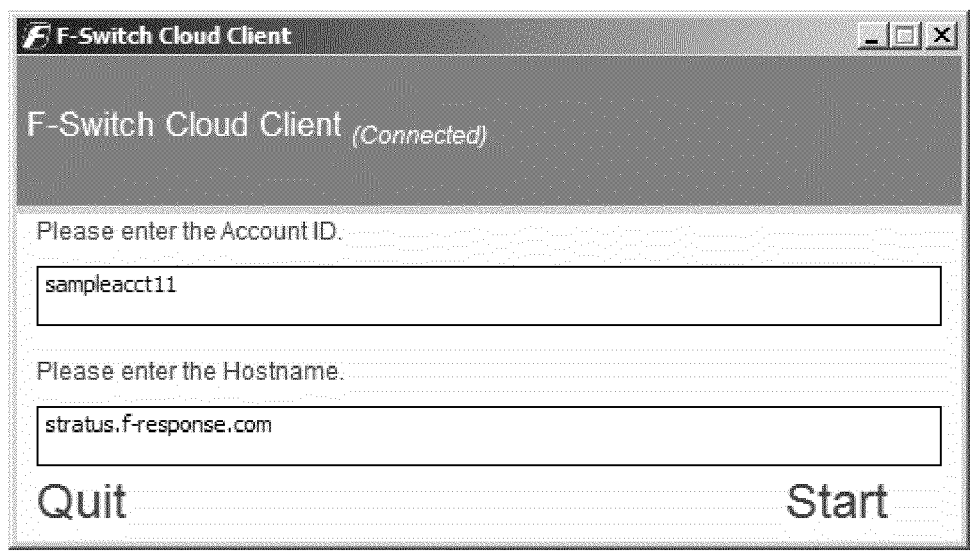
FIG. 7 illustrates a screen capture of the graphical user interface (GUI) initially presented by the subject program code installation software that is executed on each remote subject computer.

FIG. 7 illustrates a graphical screen capture of the subject program code installation software that is executed on each remote subject computer 8. The subject program code shown is for use with subject computers 8 running Windows-based operating systems.

Figure 8:
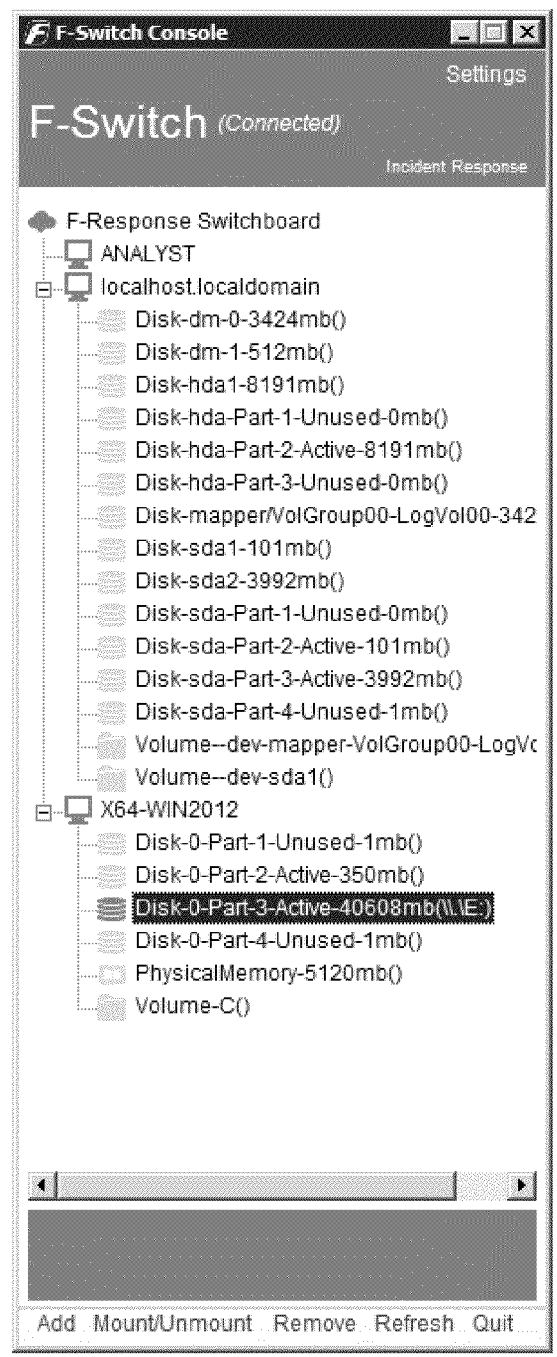
FIG. 8 illustrates a screen capture of computer code running on a user computer, and presenting the non-transitory computer-readable media for selected subject computers connected via the software switch.

FIG. 8 illustrates a screen capture showing the roster of subject computers 8, upon which subject program code has been installed for each subject computer 8, and which have connected with the Software Switch Server 2. In this depiction, subject computer 8 "X64-WIN2012" is online and available for examination, and "Disk-O-Part-3-Active-40608mb" has been mounted by the user computer 6 as logical drive "E:"via the Software Switch Server 2.

Figure 9:
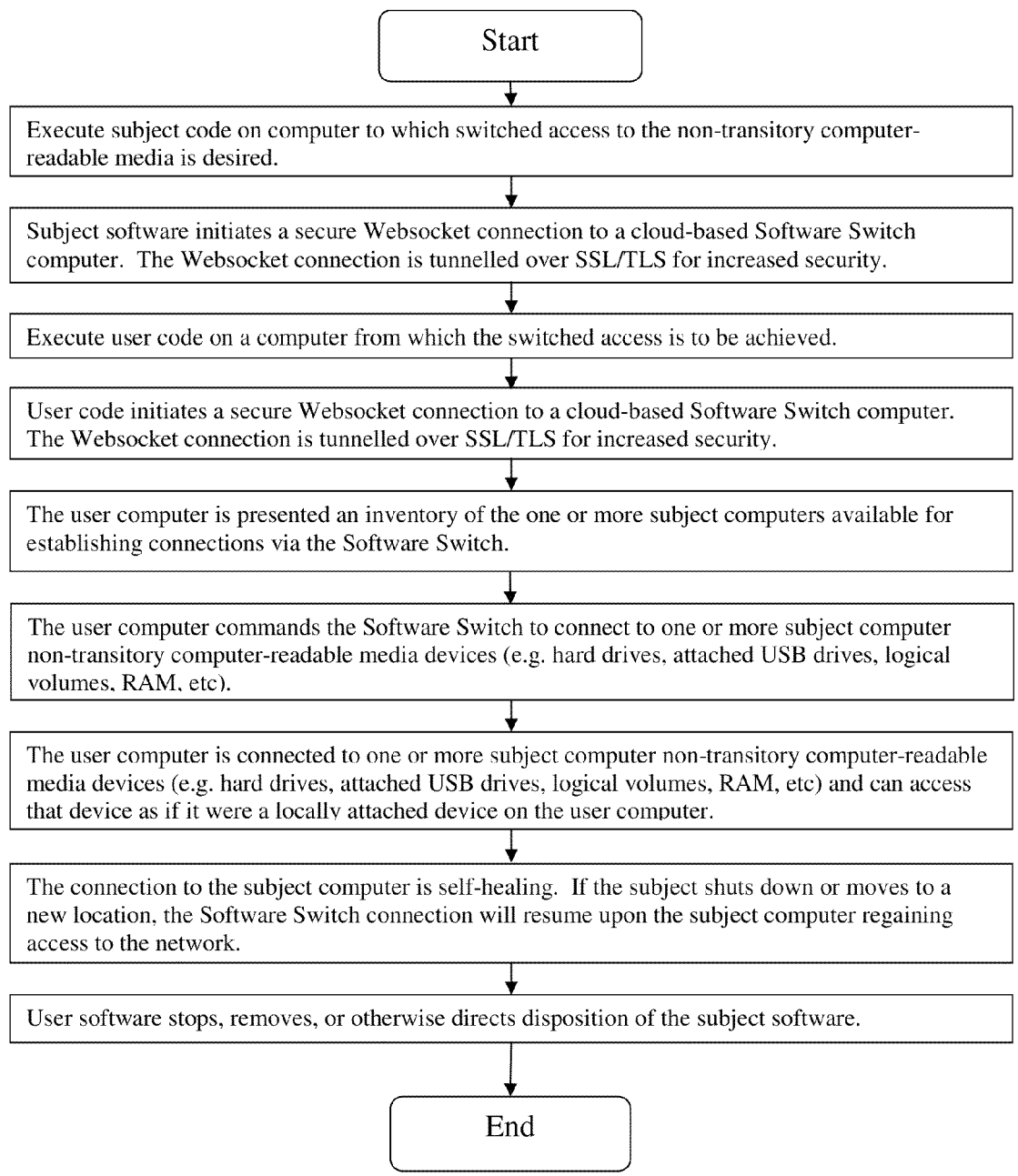
FIG. 9 illustrates a flow chart of an exemplary method according to the present invention rendered via a "cloud computing" model.

FIG. 9 illustrates a flow chart of an exemplary cloud based method according to the present invention.

Figure 10:
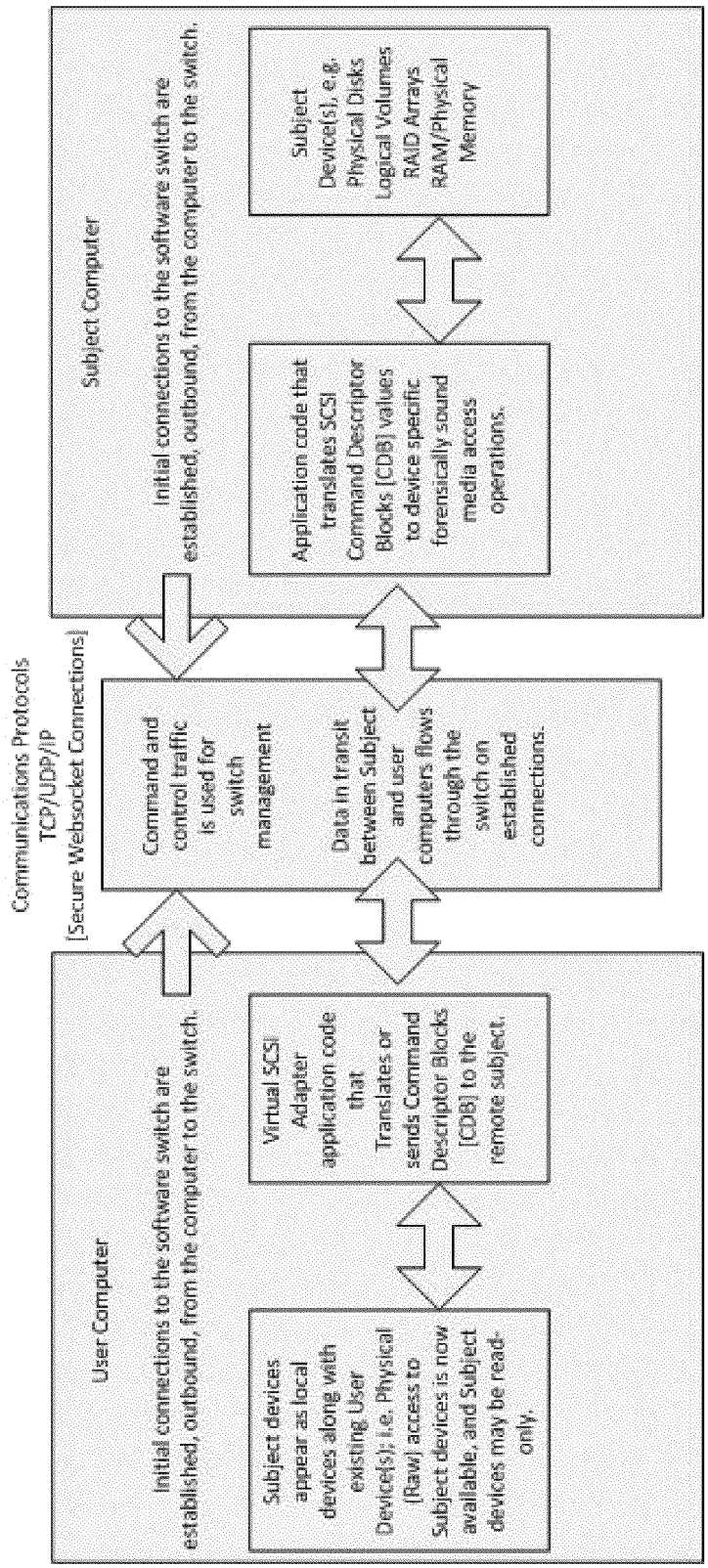
FIG. 10 illustrates a method according to the present invention whereupon every non-transitory computer-readable media device on a subject computer becomes a SCSI disk rendered to the user computer as a raw (physical or logical) non-transitory computer-readable media device.

FIG. 10 illustrates a method according to the present invention whereupon every non-transitory computer-readable media device on a subject computer becomes a SCSI disk rendered on the user computer, and that SCSI disk is rendered to the user computer as a raw (physical or logical) non-volatile, read-only device. The method translates SCSI and non-SCSI devices such that the SCSI command set is used to establish raw, read-only connectivity to subject computer devices from a second computer, over a network.

Definitions for terms used herein are provided below.

Authenticated: Having completed the process of verifying the digital identity of the sender of a communication, such as a request to log in.

Availability: The degree to which data residing on a computer system is available to the user(s) who needs the data.

Cloud-based command and control computer: A Cloud-based command and control computer is a cloud computing service located on the Internet, or "in the Cloud", that runs command and control software. The command and control software manages connections and communications between the many customers that have user and subject computers that may be connected at any time. This service can incorporate a model of networked online computers which may or may not be hosted by third parties.

Cloud Computing: Cloud Computing is Internet-based computing, whereby shared computer resources, software, storage space, and information, are provided to computers and other devices on demand over a suitable communications network.

Communications network: A network of telecommunications links and nodes arranged so that messages may be passed from one part of the network to another over multiple links and through various nodes. Examples include the Internet, local area networks, wide area networks, wireless networks, and the Public Switched Telephone Network.

Confidentiality: Ensuring that information is accessible only to those authorized to have access.

Drive: A device for the mass storage of computer data; e.g. hard drive, thumb drive, flash drive, solid state drive, etc.

eDiscovery (Electronic Discovery): eDiscovery refers to the discovery of electronically stored information (ESI) in the pre-trial phase of a lawsuit. Discovery refers to the means by which each party to a lawsuit can obtain evidence from the opposing party by means of various discovery devices, including, but not limited to, evidence that exists in the form of ESI.

ESI (Electronically Stored Information): Per the Federal Rules of Civil Procedure (FRCP), ESI is understood to be information created, manipulated, communicated, stored, and best utilized in digital form, requiring the use of computer hardware and software.

Forensically Sound: Forensically sound practices are those that do not violate the Federal Rules of Evidence (FRE) such that ESI (Electronically Stored Information) is processed in such a manner that the data can be used as evidence in a court of law. For example, ESI collected for use in a court of law is to be processed in such a manner that the data can be identified and authenticated, as mandated by the FRE. It is worthy of note that the Federal Rules of Evidence (FRE) give forensic practitioners latitude to conduct their work using the principle of reasonableness. For example, a forensic practitioner may elect not to perform an action that could reveal additional responsive data if the cost of that action is deemed to be unreasonably high; however, data not collected in a forensically sound manner may not be deemed reliable for use as evidence in a court of law.

Forensics: A scientific, systematic inspection of a computer system and the computer system contents for evidence or supportive evidence of a crime or other computer use that is being inspected.

Integrity: Ensuring that information is alterable only by those authorized to do so.

Internet: The worldwide, publicly accessible network of interconnected computer networks that transmit data by packet switching using the standard Internet Protocol (IP).

Raw storage media access: If raw storage media access is provided to computer storage media, then complete access to all information on the subject media is obtained.

Read-only: If read-only access is provided to computer storage media, then it is not possible to write to the media given the provided access.

Small Computer System Interface (SCSI): A colloquial term for interface standards developed by T10. Technical Committee T10 is responsible for SCSI Storage Interfaces and SCSI architecture standards (SAM, SAM-2, and SAM-3), which are used by SCSI, SAS, Fibre Channel, SSA, IEEE 1394, USB, and ATAPI. T10 is a Technical Committee of the InterNational Committee on Information Technology Standards (INCITS) [http://www.incits.org]. INCITS is accredited by, and operates under rules that are approved by, the American National Standards Institute (ANSI) [http://www.ansi.org].

Secure: Sound security practices have been applied to reasonably protect the confidentiality, integrity, and availability of a computer resource.

Subject Computer: The computer system upon which remote access to the non-transitory computer-readable media is rendered is the Subject Computer.

WebSocket: The WebSocket protocol, standardized by the IETF as RFC 6455, provides for fully bi-directional communications between two devices over a TCP connection. The IETF describes WebSockets in the Abstract of the RFC 6455 standard as follows:

> "The WebSocket Protocol enables two-way communication between a client running untrusted code in a controlled environment to a remote host that has opted-in to communications from that code. The security model used for this is the origin-based security model commonly used by web browsers. The protocol consists of an opening handshake followed by basic message framing, layered over TCP. The goal of this technology is to provide a mechanism for browser-based applications that need two-way communication with servers that does not rely on opening multiple HTTP connections (e.g., using XMLHttpRequest or <iframe>s and long polling)."

Cloud Computing is Internet-based computing, whereby shared computer resources, software, storage space, and information, are provided to computers and other devices on demand over a suitable communications network. The invention makes use of existing cloud computing technologies via one or more cloud-based computing servers, and via one or more cloud-based data-repository computers.

Internet protocols used in the invention include the Hypertext Transport Protocol (HTTP) [RFC2616], and the related Transport Layer Security (TLS) [RFC5246] and Secure Socket Layer (SSL) [RFC6101] protocols. HTTP is the foundation of data communication for the World Wide Web. TLS and SSL are information security protocols that allow client/server applications to communicate in a way that is designed to prevent eavesdropping, tampering, or message forgery. There are various versions of TLS (1.0, 1.1, 1.2, and any future versions) and SSL (2.0 and 3.0), and standard practice will be used to negotiate the specific protocol version to use to secure the digital data traversing the software switch. WebSocket Protocol [RFC6455] connections, which also incorporate the above mentioned protocols, provide for fully bi-directional communications between two devices over a TCP connection. The present invention makes use of this prior art to securely and efficiently transport electronically stored information (ESI) and system command and control traffic over the Internet, between subject computers and the software switch, and between client (aka user) computers and the software switch. By default, the WebSocket Protocol [RFC6455] uses port 80 for regular WebSocket connections and port 443 for WebSocket connections tunneled over Transport Layer Security (TLS).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

We claim:

1. A method of performing an Internet based forensic analysis or eDiscovery of a subject computer having a non-transitory computer-readable media comprising:

executing on a Software Switch computer a switch control program code configured to provide communications via a communication protocol;

executing on a subject computer a subject program code configured to provide communications via a communication protocol;

establishing a connection over the Internet between the Software Switch and the subject computer via the communication protocol;

executing a user program code on a user computer configured to provide communications via a communication protocol;

establishing a connection over the Internet between the Software Switch and the user computer via the communication protocol;

establishing a connection over the Internet between the subject computer and user computer via the software switch, wherein no direct connection between the user computer and the subject computer is established;

executing commands from the user computer via the software switch computer and to the subject computer which directs the subject computer to copy selected data stored in a non-transitory computer-readable media memory of the subject computer to a non-volatile memory on the user computer in a manner that catalogues and preserves the integrity of the data, wherein the communication protocol operates in accordance with a communication protocol standard that permits transmission of one or more write commands for writing data to a non-volatile memory, wherein the subject program code is configured to respond to at least one protocol command in accordance with the communication protocol standard, wherein the subject program code is optionally configured to not write data to the non-transitory computer-readable media of the subject computer in response to receiving the one or more write commands of the communication protocol standard from the user computer;

establishing a software switch connection over the Internet between the subject computer and the user computer;

performing a forensic analysis or eDiscovery process of the data stored on the subject computer via the Software Switch connection to the user computer; and outputting a report based on the forensic analysis or eDiscovery process.

2. The method according to claim 1, wherein the subject program code is configured to not write data to the non-transitory computer-readable media of the subject computer in response to receiving the one or more write commands of the communication protocol standard from the user computer.

3. The method according to claim 1, further comprising logging onto a website using the user computer, registering information on the website, and downloading the client program code from the website.

4. The method according to claim 1, further comprising downloading the subject program code from the cloud-based computer to the subject computer over the Internet.

5. The method according to claim 1, wherein the only connection between the user computer and the subject computer is via the Software Switch computer.

6. The method according to claim 1, wherein the communication protocol is a non-proprietary communication protocol and the communication protocol standard is a non-proprietary communication protocol standard.

7. The method according to claim 1, wherein the computer protocol comprises the Websocket protocol, and the method further comprises exchanging communications over the Internet via SSL/TLS.

8. The method of claim 1, wherein the forensic analysis is conducted in a manner that is suitable for use in a court of law.

9. The method of claim 1, wherein the forensic analysis is conducted such that the existing files or file system Metadata on the subject computer is not altered.

10. The method of claim 1, further comprising copying file system Metadata from the subject computer and maintaining the file system Metadata during collection via the user computer.

11. The method of claim 1, further comprising providing a computer file listing of all computer files, including deleted files for which entries remain in the file system tables of the subject computer, in the report.

12. The method of claim 1, further comprising conducting the forensic analysis such that the original ESI file system Metadata is not altered on the subject computer and is forensically preserved at the time of collection on the user computer.

13. The method of claim 1, further comprising collecting a forensic image of the subject computer to the user computer via the Software Switch.

14. The method of claim 1, further comprising selecting and uploading data comprising at least one of file system Metadata date and time information, file name, folder name, file extension, and keyword searching from the subject computer to the user computer.

15. The method of claim 1, further comprising conducting the forensic analysis without direct assistance from an expert forensics practitioner.

16. A method of performing a forensic analysis or eDiscovery of a subject computer having non-transitory computer-readable media comprising:
   executing on a software switch computer a software switch program code configured to provide communications via the communication protocol;
   executing on the subject computer a subject program code configured to provide communications via a communication protocol;
   establishing a connection between the subject computer and the software switch computer via the communication protocol;
   executing a client program code on a user computer configured to provide communications via the communication protocol;
   establishing a connection between the user computer and the software switch computer;
   executing commands to the subject computer from the user computer which traverse an established software switch computer connection and direct the subject computer to copy selected data from a non-transitory computer-readable media of the subject computer to a non-volatile memory on the user computer in a manner that catalogues and preserves the integrity of the data, wherein the communication protocol operates in accordance with a communication protocol standard that permits transmission of one or more write commands for writing data to a non-volatile memory, wherein the subject program code is configured to respond to at least one protocol command in accordance with the communication protocol standard, wherein the subject program code is optionally configured to not write data to the non-transitory computer-readable media of the subject computer in response to receiving the one or more write commands via the communication protocol standard;
   performing a forensic analysis or eDiscovery process of the data stored on the subject computer via the software switch connection to the user computer; and
   outputting a report based on the forensic analysis or eDiscovery process.

17. The method of claim 16, wherein the subject program code is optionally configured to not write data to the non-transitory computer-readable media of the subject computer in response to receiving the one or more write commands via the communication protocol standard.

18. The method of claim 16, further comprising selecting and uploading data comprising at least one of file system Metadata date and time information, file name, folder name, file extension, and keyword searching from the subject computer to the user computer through the software switch computer.

19. A computer program product, comprising one or more non-transitory computer useable media having a computer readable program code embodied therein, the computer readable program code adapted to be executed by a subject computer, a software switch computer, and a user computer to implement a method of performing a forensic investigation or eDiscovery process of the subject computer having a non-transitory computer-readable media, the computer program product comprising:
   a software switch program code for execution by the software switch computer;
   a subject program code segment for execution by the subject computer; and
   a user program code segment for execution by the user computer, wherein the subject program code and the software switch program code are executable to establish a connection between the subject computer and the software switch computer via a communication protocol, wherein the software switch program code and the user program code are executable to establish a connection between the user computer and the software switch computer via a communication protocol, wherein the subject program code is executable to respond to commands in accordance with the communication protocol standard; wherein the subject program code is executable to not write data to the non-transitory computer-readable media in response to receiving the one or more write commands via the communication protocol standard, wherein the subject program code is executable to copy selected data from the non-transitory computer-readable media of the subject computer to the non-volatile memory of the user computer via the software switch computer in a manner that catalogues and preserves the integrity of the data, and wherein the user program code is executable to perform a forensic analysis or eDiscovery process of the data stored on the subject computer via the connection from the user computer through the software switch computer.

20. The product according to claim 19, wherein the program code is executable to not provide a direct connection between the user computer and the subject computer.

21. The product according to claim 19, wherein the cloud-based computer comprises a software switch computer, the software switch program code being executable on the software switch computer, and the user program code is executable to provide a connection between a user computer and the software switch computer, and the subject program code is executable to provide a connection between a subject computer and the software switch computer, and the user directs the software switch computer to establish a software switch connection between the user computer and the subject computer so that the data copied from the subject computer is stored on the user computer.

22. The product according to claim 21, wherein the program code is executable to not provide a direct connection between the user computer and the subject computer.

23. The product according to claim 21, wherein the user program code is executable to provide a connection between the user computer and the software switch computer.

24. The product according to claim 21, wherein the subject program code is executable to provide a connection between the subject computer and the software switch computer.

25. A computer system constructed to perform an Internet based forensic analysis or eDiscovery of a subject computer having a non-transitory computer-readable media comprising:
   a Software Switch computer constructed to provide communications via a communication protocol over the Internet with the subject computer and a user computer; and
   a cloud-based software switch computer constructed to provide communications via a communication protocol over the Internet with the subject computer and the user computer, the user computer comprising a non-volatile memory constructed to catalogue and preserve the integrity of data stored thereon, the subject computer comprising a non-volatile memory to which remote access by the user is desired, the software switch computer being constructed so that the user directs the software switch computer to establish a software switch connection between the user computer and the subject computer, the software switch connection between the user computer and the subject computer being constructed so when commands are executed on the user computer that are intended for the subject computer the software switch computer will direct those commands to the subject computer, the software switch connection between the user computer and the subject computer being constructed so commands are executed on the user computer to copy selected data stored in a non-transitory computer-readable media of the subject computer to the non-volatile memory on the user computer in a manner that catalogues and preserves the integrity of the data, wherein the communication protocol operates in accordance with a communication protocol standard that permits transmission of one or more write commands for writing data to a non-transitory computer-readable media, and the subject computer is optionally configured to not write data to the non-transitory computer-readable media of the subject computer.

26. The computer system according to claim 25, wherein the Software Switch computer is a software switch Virtual Machine running on a software switch server computer.

27. The computer system according to claim 25, wherein the subject computer is configured to not write data to the non-transitory computer-readable media of the subject computer.

28. The computer system according to claim 25, wherein the subject program code is constructed to translate commands from the non-transitory computer-readable media to a SCSI non-transitory computer-readable media device to be read only and cannot write to non-transitory computer-readable media in response to receiving any command including a write command.

29. A method of performing a forensic investigation of a subject computer having a non-transitory computer-readable media with a control computer, comprising:
   executing subject program code on the subject computer, wherein the subject program code is constructed to translate commands from the non-transitory computer-readable media to a SCSI non-transitory computer-readable media device to be read only and optionally cannot write to non-transitory computer-readable media in response to receiving any command including a write command;
   executing software switch program code on the software switch computer;
   executing subject program code on the subject computer wherein the subject computer establishes a secure authenticated connection with the software switch computer;
   executing user program code on the user computer wherein the user computer establishes a secure authenticated connection with the software switch computer;
   executing user program code on the user computer wherein the user program code is constructed to send commands to control the operation of the software switch;
   executing software switch program code on the software switch computer wherein the user computer directs the switch to establish or disestablish connections between available user and subject computers; and
   establishing a secure authenticated connection between the subject computer and the user computer, wherein execution of the subject program code provides raw physical or logical access to the subject computer non-transitory computer-readable media from the user computer via the connection established at the software switch computer.

30. The method according to claim 29, wherein the subject program code is constructed to translate commands from the non-transitory computer-readable media to the SCSI non-transitory computer-readable media device to be read only and cannot write to non-transitory computer-readable media in response to receiving any command including a write command.

31. The method according to claim 29, further comprising translating commands to or from the subject computer virtual, logical, or physical non-transitory computer-readable media device to a SCSI non-transitory computer-readable media device and rendering the device as a read-only non-transitory computer-readable media device on the user computer.

32. The method according to claim 31, wherein execution of the subject program code translates communications to or from a virtual non-transitory computer-readable media device to a SCSI device and renders the subject computer device as a raw physical or logical non-volatile memory device to the user computer.

33. The method according to claim 32, wherein the virtual non-transitory computer-readable media device is a RAID, iSCSI, Network Block Device, Logical Volume Manager, or TrueCrypt device.

34. The method according to claim 29, further comprising translating commands to or from the subject computer virtual, logical, or physical non-transitory computer-readable media device to a SCSI non-transitory computer-readable media device and rendering the device as a raw physical or logical non-transitory computer-readable media device on the user computer.

35. The method according to claim 29, wherein execution of the subject program code provides read-only access to the subject non-transitory computer-readable media from the user computer.

36. The method according to claim 29, wherein execution of the subject program code provides raw physical or logical access to the subject non-transitory computer-readable media from the user computer.

37. The method according to claim 29, wherein execution of the subject program code translates communications to or from a standard non-transitory computer-readable media device to a SCSI device and renders the subject computer device as a read-only non-volatile memory device to the user computer.

38. The method according to claim 37, wherein the standard non-transitory computer-readable media device is an ATA device.

39. The method according to claim 29, wherein execution of the subject program code translates communications to or from a standard non-transitory computer-readable media device to a SCSI device and renders the subject computer device as a raw physical or logical non-volatile memory device to the user computer.

40. The method according to claim 39, wherein the standard non-transitory computer-readable media device is an ATA device.

41. The method according to claim 29, wherein execution of the subject program code translates communications to or from a virtual non-transitory computer-readable media device to a SCSI device and renders the subject computer device as a read-only non-volatile memory device to the user computer.

42. The method according to claim 41, wherein the virtual non-transitory computer-readable media device is a RAID, iSCSI, Network Block Device, Logical Volume Manager, or TrueCrypt device.

43. A computer program product, comprising one or more non-transitory computer useable media having a computer readable program code embodied therein, the computer readable program code adapted to be executed by a first computer and a user computer to implement a method of performing a forensic investigation of the first computer, having a non-transitory computer-readable media, with the user computer, the computer program product comprising: a subject code segment for execution by the first computer; a user code segment for execution by the user computer; wherein the subject code segment and the user code segment are executable to establish a connection with a software switch computer; wherein the software switch computer is directed to patch the connections between the first computer and the subject computer such that data and commands can be transmitted between the subject computer and user computer via the switch computer over the patch between the established connections; wherein the communication protocol permits transmission of one or more write commands for writing data to a non-volatile, non-transitory, memory, wherein the subject code segment is executable to respond to a plurality of commands in accordance with the communication protocol; wherein the subject program code is constructed to translate commands from a non-transitory computer-readable media device to a SCSI non-transitory computer-readable media device to be read only and cannot write to non-transitory computer-readable media in response to receiving any command including a write command; and wherein the user code segment is executable to grant full access to the media of the subject computer via the software switch connection.

* * * * *